March 8, 1966   C. M. B. READ   3,238,962
FLUID-PRESSURE FUNCTION GENERATORS
Filed May 22, 1963   2 Sheets-Sheet 1

INVENTOR

BY Colin Martin Burgess Read
Watson, Cole, Grindle & Watson
ATTORNEY

March 8, 1966  C. M. B. READ  3,238,962
FLUID-PRESSURE FUNCTION GENERATORS
Filed May 22, 1963  2 Sheets-Sheet 2

INVENTOR
Colin Martin Burgess Read
BY Watson, Cole, Grindle, Watson
ATTORNEY

United States Patent Office 3,238,962
Patented Mar. 8, 1966

3,238,962
FLUID-PRESSURE FUNCTION GENERATORS
Colin Martin Burgess Read, Glasgow, Scotland, assignor to Yarrow and Company Limited, Glasgow, Scotland, a British company
Filed May 22, 1963, Ser. No. 283,147
Claims priority, application Great Britain, May 23, 1962, 19,924/62
19 Claims. (Cl. 137—86)

This invention relates to fluid-pressure variable function generators, that is to say for devices for providing a variable functional relationship between two variables each of which is represented by the pressure of a fluid in a region.

It has previously been proposed to provide a pneumatic function generator which includes a cam that has been accurately ground to the profile of the required function, but such a device suffers from the disadvantage that the function can only be varied by replacing the cam by another cam having a different profile.

This invention provides a fluid-pressure variable function generator, which comprises an input opening through which there can be applied a fluid pressure representing an input variable, an output opening through which a fluid pressure representing an output variable can be applied to a load, a chamber into which a fluid can be introduced under pressure, and a plurality of conduits which are arranged in parallel with one another and through which fluid can leak out of the chamber, each conduit being provided with valve means for preventing fluid from passing out of the chamber through the conduit unless the fluid pressure within the chamber exceeds a certain value which is variable and/or different for different valve means, each conduit being provided with adjustable orifice means arranged in series with the associated valve means for controlling the rate of leakage of fluid through the conduit when the associated valve means is open, the inlet to the chamber being provided with a constriction so that, in operation, there is an appreciable pressure drop across the constriction when fluid is leaking out of the chamber through at least one of the conduits, and the arrangement being such that the output fluid pressure is a function of the total rate of leakage of fluid out of the chamber through the said conduits and of the input fluid pressure.

The invention also provides a fluid-pressure variable function generator, which comprises a chamber having an inlet through which a fluid can be introduced into the chamber and an output opening through which the fluid pressure within the chamber can be applied to a load, and a plurality of conduits which are arranged in parallel with one another and through which fluid can leak out of the chamber, each conduit being provided with valve means for preventing fluid from passing out of the chamber through the conduit unless the fluid pressure within the chamber exceeds a certain value which is variable and/or different for different valve means, each conduit being provided with adjustable orifice means arranged in series with the associated valve means for controlling the rate of leakage of fluid through the conduit when the associated valve means is open and the inlet being provided with a constriction so that, in operation, there is an appreciable pressure drop between the pressure applied to the inlet and the pressure within the chamber when fluid is leaking through at least one of the conduits.

In operation, fluid is supplied to the inlet at a pressure which represents a variable and the pressure within the chamber, which is the pressure that is applied to the load, is equal to the pressure applied to the inlet less the pressure drop across the constriction. The pressure drop across the constriction is determined by the rate of flow of fluid into the chamber, which is equal to the total rate of leakage of fluid through the conduits (it being essential that the load shall not demand any flow of fluid). The fluid pressure that is applied to the load is therefore a function of the fluid pressure applied to the inlet and the form of the function can be varied by adjusting the settings of the different orifice means.

Each adjustable orifice means is advantageously a needle valve.

Advantageously, in order to enable the form of the function to be varied further, the valve means are adjustable to enable the pressures at which the valve means open to be varied. Each valve means may be either a spring-loaded valve or a non-return valve and means for applying a constant fluid pressure to the outlet side of the valve.

Advantageously, the variable function generator is a pneumatic variable function generator, that is to say, it is suitable for use with a gas as the operating fluid.

The extent to which the form of the generated function can be varied is limited by the fact that the number of conduits through which fluid leaks from the chamber cannot decrease as the pressure within the chamber increases, and therefore the function generator cannot itself generate a function having positive curvature. Further, the slope of the function at the origin cannot be increased above unity and the value of the function at the origin cannot be varied.

In order to permit the generation of functions that are not subject to these two limitations, the variable function generator may be modified by replacing the output opening through which the fluid pressure within the chamber can be applied to a load by an output conduit for providing communication between a source of fluid under pressure and the load, and control means responsive to the pressure drop across the inlet constriction and arranged to maintain the output fluid pressure, plus or minus a constant, equal or directly proportional to the said pressure drop.

The control means may include a flexible diaphragm of which one surface is exposed to the fluid pressure on the upstream side of the inlet constriction and the other surface is exposed to the fluid pressure on the downstream side of the inlet constriction. Advantageously, the control means also includes a second flexible diaphragm which is rigidly interconnected to the first mentioned flexible diaphragm to form a diaphragm assembly, one surface of the second flexible diaphragm being exposed to the output fluid pressure and the arrangement being such that the action of the output fluid pressure on the second flexible diaphragm is opposed to the force on the first flexible diaphragm resulting from the said pressure drop, and control valve means are arranged so as to control the output fluid pressure as to maintain the diaphragm assembly in a balanced condition. The first mentioned flexible diaphragm may form a part of the wall of the chamber. The second flexible diaphragm may also form a part of the wall of the chamber, the effective area of the second flexible diaphragm being different from the effective area of the first mentioned flexible diaphragm.

Advantageously, the control valve means is arranged to allow fluid to escape from the output conduit at a controlled rate, the output conduit being provided with a constriction situated upstream of the valve means so that, in operation, there is an appreciable pressure drop between the said source of fluid under pressure and the valve means, and the arrangement being such that an increase in the pressure drop across the said inlet constriction tends to decrease the degree of opening of the control valve means and a decrease in the pressure drop across the inlet constriction tends to increase the degree of opening of the control valve means. The control valve means preferably comprises a fixed nozzle through which fluid can escape from the output conduit and a member coupled to the diaphragm assembly and movable towards and away from the outer end of the nozzle to restrict and facilitate, respectively, the escape of fluid from the output conduit through the nozzle.

There may be provided resilient means arranged to apply a substantially constant bias to the control means. Advantageously, the resilient means is adjustable to permit variation of the said bias.

In order to permit the generation of functions of negative curvature, the variable function generator nozzle modified by replacing the output opening through which the fluid pressure within the chamber can be applied to a load by an output conduit for providing communication between a source of fluid under pressure and the load, the output conduit being in communication with the inlet to the chamber on the upstream side of the constriction in the said inlet, an input conduit not in communication with the chamber, and control means responsive to the pressure drop across the inlet constriction and arranged to maintain the output fluid pressure, plus or minus a constant, equal to or directly proportional to the difference between the said pressure drop and the input pressure.

In the form of function generator modified to permit the generation of functions of negative curvature and in which the slope of the function at the origin is greater than unity, the control means advantageously includes a flexible diaphragm of which one surface is exposed to the fluid pressure on the upstream side of the inlet constriction and the other surface is exposed to the fluid pressure on the downstream side of the inlet constriction. Preferably, the control means also includes an additional flexible diaphragm which is rigidly interconnected to the first mentioned flexible diaphragm to form a diaphragm assembly, one surface of the said additional flexible diaphragm being exposed to the input fluid pressure and the arrangement being such that the action of the input fluid pressure on the said additional flexible diaphragm is opposed to the force on the first flexible diaphragm resulting from the said pressure drop, and control valve means arranged so to control the output fluid pressure as to maintain the diaphragm assembly in a balanced condition. The first mentioned flexible diaphragm may form a part of the wall of the chamber. The second flexible diaphragm may also form a part of the wall of the chamber, the effective area of the second flexible diaphragm being different from the effective area of the first mentioned flexible diaphragm.

Advantageously, the control valve means is arranged to allow fluid to escape from the output conduit at a controlled rate, the output conduit being provided with a constriction situated upstream of the valve means so that, in operation, there is an appreciable pressure drop between the said source of fluid under pressure and the valve means, and the arrangement being such that an increase in the pressure drop across the said inlet constriction tends to increase the degree of opening of the control valve means and a decrease in the pressure drop across the inlet constriction tends to decrease the degree of opening of the control valve means. The control valve means preferably comprises a fixed nozzle through which fluid can escape from the output conduit and a member coupled to the diaphragm assembly and movable towards and away from the outer end of the nozzle to restrict and facilitate, respectively, the escape of fluid from the output conduit through the nozzle.

There may be provided resilient means arranged to apply a substantially constant bias to the control means. Advantageously, the resilient means is adjustable to permit variation of the said bias.

The invention also provides a fluid system which includes a fluid-pressure variable function generator as hereinbefore described and a fluid-pressure relay coupled to the output of the function generator. The fluid-pressure relay is a device having a high input impedance and a low output impedance, so that the relay supplies a flow of fluid without demanding any substantial flow of fluid from the function generator. The pressure gain provided by the relay may be of the order of unity.

The invention further provides a fluid system which includes a fluid-pressure amplifier and a fluid-pressure variable function generator arranged as a feedback element around the amplifier, the gain of the amplifier being sufficiently high for the output/input relationship of the system to approximate to the inverse of the output/input relationship of the function generator alone. The fluid-pressure amplifier is generally similar to the fluid-pressure relay except that the pressure gain is high, instead of being of the order of unity. This system can generate functions of positive curvature, but not functions of negative curvature. Advantageously, the system also includes a second fluid-pressure variable function generator as hereinbefore described of which the output is coupled to the input of the amplifier. The system can then generate any single-valved function subject to the limitations imposed by the finite number of conduits and the ranges of adjustment of the valve means and orifice means.

Three forms of pneumatic variable function generator constructed in accordance with the invention and three pneumatic systems each including one or more of one of the forms of function generator will now be described by way of example in greater detail with reference to the accompanying drawings in which.

Figure 1:
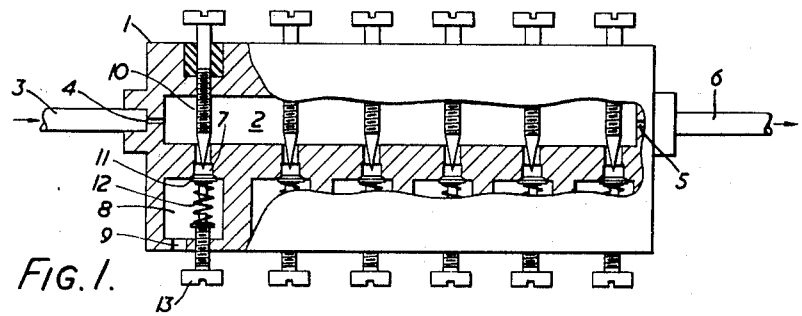
FIG. 1 is an axial section through one form of pneumatic variable function generator.

Referring to FIG. 1 of the drawings, the first form of pneumatic function generator comprises a block 1 within which there is formed a chamber 2. An input pipe 3 leads to an inlet at one end of the chamber 2, the inlet being formed with an orifice 4 of restricted diameter. At the other end of the chamber 2, there is provided an output opening 5 which leads to an output pipe 6.

Six conduits through which gas can leak from the chamber 2 are arranged along the length of the chamber. Each of these conduits comprises a bore 7, which provides communication between the chamber 2 and a cavity 8. The cavity 8 is open to the atmosphere through an opening 9, which is offset with respect to the bore 7. The effective cross-sectional area of the entrance to each bore 7 is controlled by an adjustable needle valve 10, which is inserted through the portion of the block 1 that is opposite to the bore 7 and is in screw-threaded engagement with the block 1. The outer end portions of each bore 7 is flared outwardly and serves as a seating for a valve 11 which is urged towards its closed position by means of a helical spring 12. The helical spring 12 acts in compression between the head of the valve 11 and an adjusting screw 13, which enables the pressure at which each valve 11 opens to be varied.

The function generator operates in the following manner. Compressed air is supplied through the input pipe 3 at a pressure within some convenient range, for example, 3–15 or 3–27 pounds per square inch. The exact pressure $x$ represents the input quantity and the pressure at the output opening, $y$ represents the output quantity. Neglecting any pressure gradient along the chamber, the difference $x-y$ is equal to the pressure drop across the orifice 4.

The adjusting screws 13 are so set that the different valves 11 open at different pressure and thus, as the input pressure $x$ increases, more and more of the valves 11 open and the number of conduits through which air leaks out of the chamber 2 increases. The contribution made by each conduit, when the associated valve 11 is open, to the total leakage rate depends upon the setting of the associated needle valve 10.

The manner of operation of the function generator shown in FIG. 1 can be analysed in the following manner using the following symbols, the conduits being numbered from 1 to 6:

$x$ = input pressure
$y$ = output pressure
$F$ = total rate of leakage of gas through the conduits
$F_b$ = rate of leakage of gas through the $b$th conduit
$y_b$ = pressure at which the valve 11 associated with the $b$th conduit opens
$K_b$ = rate of flow of gas per unit pressure difference across the orifice formed by the needle valve 10 associated with the $b$th conduit
$K_0$ = rate of flow of gas per unit pressure difference across the orifice 4
$n$ = number of valves 11 that are open.

Assuming capillary flow, the rate of leakage through each conduit is proportional to the difference between the output pressure $y$ and the pressure at which the associated valve 11 opens, because each valve 11 will tend to maintain a constant pressure drop across itself.

Therefore
$$F_b = K_b(y - y_b) \quad (y \geq y_b)$$
and
$$F = \sum_{b=1}^{n} K_b(y - y_b) \quad (y_n < y < y_{n+1})$$

But the pressure drop across the orifice 4 is $F/K_0$, and therefore
$$y = x - \frac{1}{K_0}\sum_{b=1}^{n} K_b(y - y_b) \quad (y_n < y < y_{n+1})$$

Differentiating to find the slope in this interval gives:
$$\frac{dy}{dx} = 1 - \frac{1}{K_0}\sum_{b=1}^{n} K_b \frac{dy}{dx} \quad (y_n < y < y_{n+1})$$

or
$$\frac{dy}{dx} = \frac{1}{1 + \frac{1}{k_0}\sum_{b=1}^{n} K_b} \quad (y_n < y < y_{n-1})$$

The slope in the interval $(y_n, y_{n+1})$ may be expressed in terms of the slope in the interval $(y_{n-1}, y_n)$ in the following manner:

$$\frac{dx}{dy} = \frac{1}{1 + \frac{1}{K_0}\sum_{b=1}^{n} K_b - \frac{K_n}{K_0}} \quad (y_{n-1} < y < y_n)$$

or
$$\frac{dy}{dx} = 1 + \frac{1}{K_0}\sum_{b=1}^{n} K_b - \frac{K_n}{K_0} \quad (y_{n-1} < y < y_n)$$

Putting
$$\frac{dx}{dy} = \left[\frac{dx}{dy}\right]_{(y_{n-1}, y_n)} \quad (y_{n-1} < y < y_n)$$

and
$$\frac{dx}{dy} = \left[\frac{dx}{dy}\right]_{(y_n, y_{n+1})} \quad (y_n < y < y_{n+1})$$

and correspondingly for
$$\frac{dy}{dx}$$

gives
$$\left[\frac{dx}{dy}\right]_{(y_n, y_{n+1})} = \left[\frac{dx}{dy}\right]_{(y_{n-1}, y_n)} + \frac{K_n}{K_0}$$

or
$$\left[\frac{dy}{dx}\right]_{(y_n, y_{n+1})} = \frac{1}{\left[\frac{dx}{dy}\right]_{(y_{n-1}, y_n)} + \frac{K_n}{K_0}}$$

It will be seen that the slope
$$\left(\frac{dy}{dx}\right)$$

remains constant in each interval considered, the value of the slope being determined by the $K_b$'s ($b = 1 \ldots n$), that is to say, by the settings of the needle valves 10. The position of the endpoints of the intervals are determined by the $y_b$'s ($b = 1 \ldots n$), that is to say, by the settings of the screws 13.

Also,
$$\left[\frac{dy}{dx}\right]_{(y_n, y_{n+1})} < \left[\frac{dy}{dx}\right]_{(y_{n-1}, y_n)}$$

so that the function $y(x)$ has negative curvature.

Figure 2:
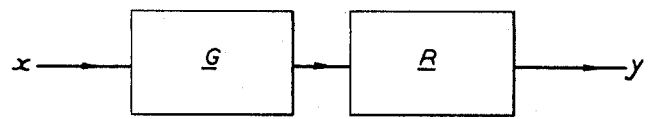
FIGS. 2 to 4 show schematically the arrangement of three pneumatic systems each including a pneumatic variable function generator as shown in FIG. 1.

Referring to FIG. 2 of the drawings, one form of pneumatic system comprises a pneumatic relay R, of which the input is connected to the output of a pneumatic variable function generator G, the function generator G being as shown in FIG. 1. In this system, the pneumatic relay R serves as a suitable high-impedance load for the function generator G and compensates for the attenuation in the function generator G, if desired also providing a gain.

Figure 3:
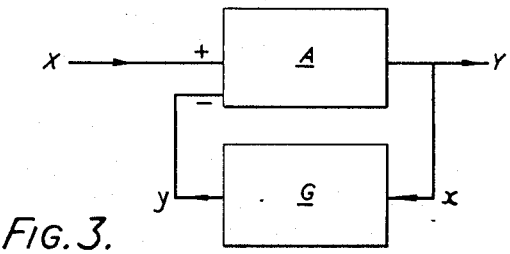

Referring to FIG. 3 of the drawings, a second form of pneumatic system comprises a high-gain pneumatic amplifier A and a pneumatic variable function generator G as shown in FIG. 1 arranged as a feedback element around the amplifier A.

If the gain of the amplifier A is sufficiently high, the functional relationship between the input quantity X of the whole system and the output quantity Y of the whole system is approximately the inverse of the functional relationship between $x$ and $y$, the input and output quantities of the function generator G alone.

Thus, if $y = f(x)$, $X \simeq f(Y)$.

This enables the endpoints of the intervals (in each of which the slope is constant) to be set with respect to the input quantity X and results in the generation of functions of positive curvature.

Figure 4:
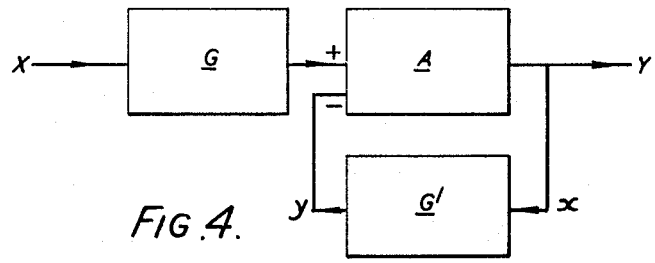

Referring to FIG. 4 of the drawings, a third form of pneumatic system is the same as that shown in FIG. 2 except that second pneumatic variable function generator $G^1$ exactly similar to G is provided, the output of the function generator $G^1$ being coupled to the input of the amplifier A. This arrangement enables functions of both positive and negative curvature, and also functions of mixed curvature, to be generated. Nevertheless, the functions that can be generated are still subject to two limitations of considerable practical importance for some applications. First, the value of $y$ at the origin cannot be varied and, secondly, the value of $$dy/dx$$

at the origin cannot be reduced below unity.

Figure 5:
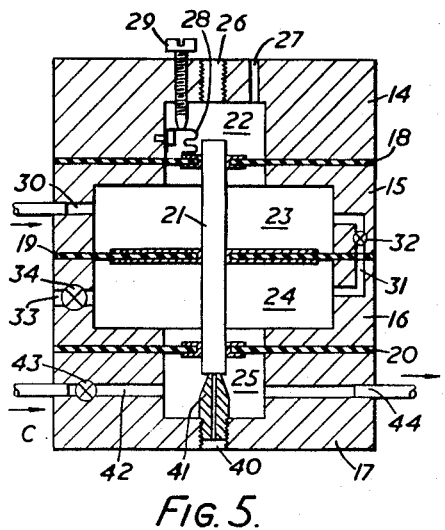
FIG. 5 is a diagrammatic axial section through a second form of pneumatic variable function generator.

Referring to FIG. 5 of the drawings, the second form of pneumatic variable function generator comprises a generally cylindrical metal casing, which is in four parts, 14, 15, 16, and 17. Clamped between the two upper parts (as seen in FIG. 5) 14 and 15 is a flexible diaphragm 18. A second flexible diaphragm 19 is clamped between the two parts 15 and 16, and a third flexible diaphragm 20 is clamped between the two lower parts 16 and 17. The internal configuration of the casing is such that the effective areas of the first and third diaphragms 18 and 20 are equal to one another and are each less than the effective area of the second diaphragm 19. The centre portions of the three diaphragms 18, 19 and 20 are rigidly interconnected by means of a vertical spindle 21, which is coaxial with the casing.

The interior of the casing is divided by the three diaphragms 18, 19 and 20 into a first chamber 22 above the first diaphragm 18, a second chamber 23 between the first and second diaphragms 18 and 19, a third chamber 24 between the second and third diaphragms 19 and 20, and a fourth chamber 25 below the third diaphragm 20.

The first chamber 22 is open to the atmosphere through a bore 26, which is coaxial with the casing, and through a parallel bore 27 both formed in the upper part 14 of the casing. Situated within the first chamber 22 is a spring 28, which bears downwardly on the upper part of the spindle 21, where it is secured to the first diaphragm 18, the force exerted by the spring 28 being adjustable by means of a screw 29.

The second chamber 23 has an inlet 30 formed in the part 15 of the casing and is in communication with the third chamber 24 through a conduit 31, which is formed by bores in the parts 15 and 16 of the casing, together with a registering aperture in the second diaphragm 19. The conduit 31 is provided with an orifice 32.

The third chamber 24 is formed with a plurality of outlet conduits 33 each of which is formed in the part 16 of the casing and is provided with a valve, which is indicated generally by the reference numeral 34. Only one such outlet conduit 33 and associated valve 34 is shown.

Figure 6:
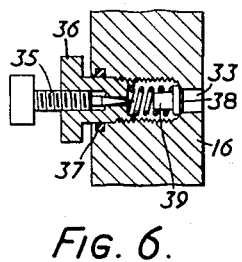
FIG. 6 is an axial section on a larger scale through one of the valves of the pneumatic variable function generator shown in FIG. 5.

Referring to FIG. 6 of the drawings, each valve 34 comprises an adjustable needle valve 35 which is screwed into an axial bore in a plug 36. The plug 36 is screwed into the outer end portion of the outlet conduit 33 and a sealing ring 37 is provided. The inner end portion of the outlet conduit 33 is of reduced diameter to provide an annular seating for a non-return valve 38, which is urged against the seating by a coil spring 39, which acts in compression between the inner end of the plug 36 and the valve 38. Thus, in operation, the non-return valve 38 remains closed until the pressure within the third chamber 24 exceeds a given value, which depends on the setting of the plug 36, when the valve 38 opens and allows air to escape from the third chamber 24 at a rate which depends upon the setting of the needle valve 35. As in the case of the pneumatic variable function generator shown in FIG. 1 of the drawings, the different valves 34 (which correspond to the valves 10 and 11 shown in FIG. 1) are in general set to open at different pressures and to give different leakage rates when open.

Referring again to FIG. 5 of the drawings, the wall of the fourth chamber 25 is provided with a bore 40, which is formed in the part 17 of the casing and coaxially with the casing and which is exactly similar to the bore 26. Fitted in the bore 40 is a nozzle 41 of which the inner end can be closed by the lower end of the spindle 21. Leading into the fourth chamber 25 is a supply conduit 42, which is formed as a bore in the part 17 of the casing and is provided with a constriction 43, and an output conduit 44, which is also formed as a bore in the part 17 of the casing, leads out of the fourth chamber.

The second form of pneumatic variable function generator operates in the following manner. Air is supplied to the inlet 30 to the second chamber 23 at a pressure which represents an input variable $x$, and air from the second chamber 23 passes into the third chamber 24 through the conduit 31 and orifice 32. In the steady state, the rate at which air enters the third chamber 24 through the conduit 31 is equal to the total rate at which air leaks out of the third chamber 24 through the outlet conduits 33 and associated valves 34 which depends upon both the air pressure within the third chamber 24 and the setting of the valves 34. The air pressure within the fourth chamber represents an output variable $y$ and is equal to the pressure at which air is supplied to the supply conduit 42 less the pressure drop across the orifice 43, and this pressure drop is determined by the rate of flow of air through the orifice 43 which, in the steady state, is equal (assuming that the load connected to the output conduit 43 does not demand any air flow) to the rate of escape of air from the fourth chamber 25 through the nozzle 41. The rate of flow of air through the nozzle 41 depends in turn upon the air pressure within the fourth chamber 25 and upon the position of the spindle 21, which is determined by the air pressures within the chambers 22, 23, 24, by the setting of the adjusting screw 29 and by the relation between the effective areas of the three diaphragms 18, 19 and 20.

Figure 7:
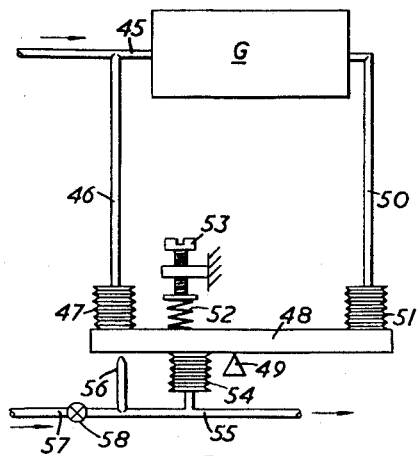
FIG. 7 shows schematically the relation between the second and first forms of pneumatic variable function generator.

The form of function $H(x)$ generated by the second form of function generator can most readily be appreciated by referring to FIG. 7 of the drawings, which shows diagrammatically an equivalent arrangement incorporating a pneumatic variable function generator of the first form (which is equivalent to the third chamber 24 of the second form of function generator, together with the inlet 31, orifice 32, outlet conduits 33 and valves 34, but with flexible diaphragms 19 and 20 replaced by rigid walls.

Referring to FIG. 7, the arrangement comprises a function generator G, to the input of which air can be supplied through a tube 45 from which a branch tube 46 leads to a flexible bellows 47 of which the upper end is fixed and the lower end bears against the upper side of a beam 48 pivotably mounted at 49. The output of the function generator G is applied through a tube 50 to another bellows 51 of which the upper end is fixed and the lower end bears against the upper side of the beam 48 at the other end thereof. Also bearing downwardly against the beam 48 is a coil spring 52, the degree of compression of which can be adjusted by means of a screw 53. Bearing upwardly against the under surface of the beam 48 opposite the spring 52 is a bellows 54 of which the lower end is fixed and which is in communication with an output tube 55 which is in communication with a nozzle 56 which can be partially closed by the underside of the beam 48. Air can be supplied to the nozzle 56 through a supply tube 57 provided with an orifice 58.

The pressure in the bellows 47 in the arrangement shown in FIG. 7 corresponds to the pressure in the chamber 23 in the second form of generator, the pressure in the bellows 51 is equal to the output pressure from the function generator G in the arrangement shown in FIG. 7 and therefore corresponds to the pressure in the chamber 24 in the second form of generator, and the pressure in the bellows 54 in the arrangement shown in FIG. 7 corresponds to the pressure in the chamber 25 in the second form of generator. Also, assuming that the bellows 47, 51 and 54 all have the same cross-sectional area, the ratio of the distance between the point of application of the bellows 47 or the bellows 51 and the fulcrum 49 of the beam 48 to the distance between the point of application of the bellows 54 or the spring 52 and the fulcrum 49 in the arrangement shown in FIG. 7 is equal to the ratio of the difference between the effective area of the diaphragm 19 and the effective area of diaphragm 18 or the diaphragm 20 to the effective area of the diaphragm 18 or the diaphragm 20 in the second form of generator. Finally, the force exerted by the spring 52 in the arrangement shown in FIG. 7 corresponds to the force exerted by the spring 28 in the second form of generator.

In operation of the arrangement shown in FIG. 7, the beam 48 is kept in balance by the action of the nozzle 56, which serves the same purpose as the nozzle 41 in the second form of generator. If the beam pivots to increase its distance from the nozzle 56, this causes the pressure in the bellows 54 to fall, which in turns tends to cause the beam to pivot in the opposite sense and so approach the nozzle 56. If the beam pivots to decrease its distance from the nozzle 56, this causes the pressure in the bellows 54 to rise, which in turn tends to cause the beam to pivot in the first mentioned sense and so to increase its distance from the nozzle 56.

If, in the arrangement shown in FIG. 7, the input pressure (which is equal to the pressure in the bellows 47) is $x$, the output pressure of the function generator G (which is equal to the pressure in the bellows 51) is $f(x)$, so that the pressure drop across the orifice 32 is $x-f(x)$, the output pressure of the system (which is equal to the pressure in the bellows 54) is $R(x)$, the force exerted by the spring 52 is equal in magnitude (but opposite in sign) to the force exerted by the bellows 54 when the pressure therein is $H(x_0)$, and the said ratio of distances is K, then, assuming that the bellows 47, 51 and 54 each have unit cross-sectional area, the requirement for the beam 48 to be balanced is:

$$Kx+H(x_0)-H(x)-Kf(x)=0$$

or $$H(x)-H(x_0)=K[x-f(x)]$$

Thus, the output fluid pressure $H(x)$, minus a constant $H(x_0)$, is equal to (if $K=1$) or directly proportional to (if $K \neq 1$) the pressure drop across the orifice 32.

The form of $f(x)$, which is equal to $y$ (that is to say, the output pressure of the first form of function generator), has been discussed hereinbefore in connection with the first form of function generator. $H(x_0)$ is approximately constant, the degree of approximation depending upon the sensitivity afforded by the nozzle 56, and its value can be varied by adjusting the screw 53.

Figure 8:
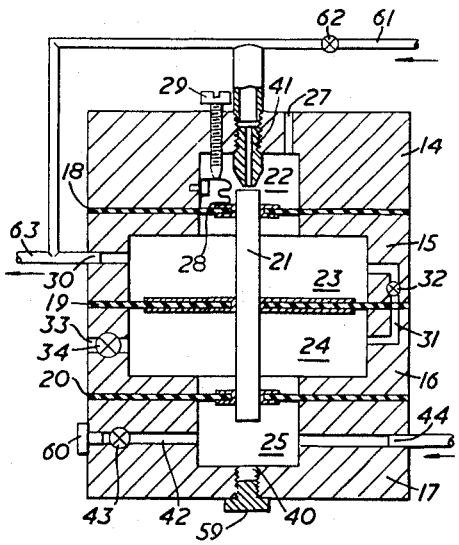
FIG. 8 is a diagrammatic axial section through a third form of pneumatic variable function generator.

Referring to FIG. 8 of the drawings, the third form of pneumatic variable function generator is the same as the second form except that the input and output connections and the position of the nozzle 41 are altered to permit the generation of functions of negative curvature. Thus, the nozzle 41 is removed and inserted in the bore 26 (which is of the same diameter as the bore 40), and a plug 59 is inserted to close the bore 40. The supply conduit 42 is closed by a plug 60. An air supply pipe 61, which is provided with a fixed orifice 62, is arranged to supply air from a constant-pressure supply to the nozzle 41 and to an outlet pipe 63, which is connected to the bore 30, which previously served as an inlet. The conduit 44, which previously served as an output conduit, now serves as an input conduit. Thus, the second form of function generator can readily be converted into the third form of function generator, which can in turn readily be converted into the second form of function generator.

In the operation of the third form of function generator, the action of the nozzle 41 in co-operation with the end of the spindle serves so to control the air pressure in the outlet pipe 63, and therefore in the chamber 23, that the spindle 21 is maintained in an equilibrium position.

As stated hereinbefore, the third form of pneumatic variable function generator permits the generation of functions of negative curvature in which the value of the slope at the origin is greater than unity.

I claim:

1. A fluid-pressure variable function generator, which comprises a chamber, an inlet conduit communicating with the interior of the chamber, an inlet constriction formed in the inlet conduit, a plurality of outlet conduits communicating with the interior of the chamber, a plurality of adjustable throttle valve means fitted one in each outlet conduit, a plurality of relief valve means fitted one in each outlet conduit and each arranged to open at a determined value of the fluid pressure within the chamber, and pressure responsive means responsive to the pressure of the fluid in the said chamber.

2. A fluid-pressure variable function generator as claimed in claim 1, in which each adjustable throttle valve means is a needle valve.

3. A fluid-pressure variable function generator as claimed in claim 1, in which each relief valve means is adjustable to vary the value of the pressure of the fluid in the chamber at which the relief valve opens.

4. A fluid-pressure variable function generator as claimed in claim 1, in which each relief valve means is spring-loaded.

5. A fluid system comprising a fluid-pressure amplifier and a fluid-pressure variable function generator which comprises a chamber, an inlet conduit communicating with the interior of the chamber, and inlet constriction formed in the inlet conduit, a plurality of outlet conduits communicating with the interior of the chamber, a plurality of adjustable throttle valve means fitted one in each outlet conduit, a plurality of relief valve means fitted one in each outlet conduit and each arranged to open at a determined value of the fluid pressure within the chamber, and an output conduit leading from the chamber, the fluid-pressure variable function generator being arranged as a feed back element around the amplifier, the gain of the amplifier being sufficiently high for the output/input relationship of the system to approximate to the inverse of the output/input relationship of the function generator alone.

6. A fluid-pressure variable function generator, which comprises a chamber, an inlet conduit communicating with the interior of the chamber, an inlet constriction formed in the inlet conduit, a plurality of outlet conduits communicating with the interior of the chamber, a plurality of adjustable throttle valve means fitted one in each outlet conduit, a plurality of relief valve means fitted one in each outlet conduit and each arranged to open at a determined value of the fluid pressure within the chamber, and a second chamber, a second conduit communicating with the interior of the second chamber and fluid-pressure control means responsive to the pressure in the second chamber and to the pressure drop across the inlet constriction and arranged to maintain a linear relationship between the pressure in the second chamber and the said pressure drop.

7. A fluid-pressure variable function generator as claimed in claim 6, in which the fluid-pressure control means is arranged to vary the pressure of the fluid in the second chamber in response to changes in the pressure of the fluid in the inlet conduit upstream of the inlet constriction.

8. A fluid-pressure variable function generator as claimed in claim 6, in which the fluid-pressure control means is arranged to vary the pressure of the fluid in the inlet conduit upstream of the inlet constriction in response to changes in the pressure of the fluid in the second chamber.

9. A fluid-pressure variable function generator which comprises a first chamber, a first inlet conduit communicating with the interior of the first chamber, a first inlet constriction formed in the inlet conduit to the first chamber, a plurality of outlet conduits communicating with the interior of the first chamber, a plurality of adjustable throttle means fitted one in each outlet conduit, a plurality of relief valve means fitted one in each outlet conduit and each arranged to open at a determined value of the fluid pressure within the first chamber, a first flexible diaphragm forming a wall to the first chamber, a second flexible diaphragm whose effective area is less than that of the first flexible diaphragm, the second flexible diaphragm being disposed opposite to the first diaphragm and forming a wall to the first chamber, a second chamber, a second inlet conduit communicating with the interior of the second chamber, a second inlet constriction formed in the inlet conduit to the second chamber, the said second flexible diaphragm forming a wall to the second chamber, a third chamber in communication with its upstream end of the first inlet conduit which inlet conduit forms an outlet conduit to the third chamber, a third inlet conduit communicating with the third chamber, a third flexible diaphragm of effective area equal to that of the second flexible diaphragm disposed opposite the first flexible diaphragm and forming a wall to the third chamber, the outer surface of the third flexible diaphragm being exposed to the ambient pressure, a spindle rigidly interconnecting the three flexible diaphragms and projecting at one end into the second chamber, nozzle means situated in the second chamber for fluid escape therefrom, the nozzle means being adjacent to the said end of the spindle and co-operating therewith to form a variable fluid flow resistance varying on movement of the spindle relative to the nozzle means.

10. A fluid-pressure variable function generator as claimed in claim 9 in which there is provided spring means arranged to urge the spindle axially.

11. A fluid-pressure variable function generator as claimed in claim 10 in which the spring means is adjustable.

12. A fluid-pressure variable function generator which comprises a first chamber, a first inlet conduit communicating with the interior of the first chamber, a first inlet constriction formed in the inlet conduit to the first chamber, a plurality of outlet conduits communicating with the interior of the first chamber, a plurality of adjustable throttle means fitted one in each outlet conduit, a plurality of relief valve means fitted one in each outlet conduit and each arranged to open at a determined value of the fluid pressure within the first chamber, a first flexible diaphragm forming a wall to the first chamber, a second flexible diaphragm whose effective area is less than that of the first flexible diaphragm, the second flexible diaphragm being disposed opposite to the first diaphragm and forming a wall to the first chamber, a second chamber, a second inlet conduit communicating with the interior of the second chamber, the said second flexible diaphragm forming a wall to the second chamber, a third chamber in communication with the upstream end of the first inlet conduit which inlet conduit forms an outlet conduit to the third chamber, a third inlet conduit communicating with the third chamber, a third flexible diaphragm of effective area equal to that of the second flexible diaphragm disposed opposite the first flexible diaphragm and forming a wall to the third chamber, the outer-surface of the third flexible diaphragm being exposed to the ambient pressure, a spindle rigidly interconnecting the three flexible diaphragms and projecting at one end beyond the third flexible diaphragm, nozzle means adjacent to the said end of the spindle and co-operating therewith to form a variable fluid-flow resistance varying on movement of the spindle relative to the nozzle means, a supply conduit communicating with the third inlet conduit and with the nozzle means, and a third constriction formed in the supply conduit upstream of both the nozzle means and the inlet conduit.

13. A fluid-pressure variable function generator as claimed in claim 12, in which there is provided spring means arranged to urge the spindle axially.

14. A fluid-pressure variable function generator as claimed in claim 13 in which the spring means is adjustable.

15. A fluid pressure variable function generator unit which comprises a first chamber, a first inlet conduit communicating with the intetrior of the first chamber, a first inlet constriction formed in the inlet conduit to the first chamber, a plurality of outlet conduits communicating with the interior of the first chamber, a plurality of adjustable throttle means fitted one in each outlet conduit, a plurality of relief valve means fitted one in each outlet conduit and each arranged to open at a determined value of the fluid pressure within the first chamber, a first flexible diaphragm forming a wall to the first chamber, a second flexible diaphragm whose effective area is less than that of the first flexible diaphragm, the second flexible diaphragm being disposed opposite to the first diaphragm and forming a wall to the first chamber, a second chamber, second and third conduits communicating with the interior of the second chamber, an inlet constriction formed in one of said conduits, the said second flexible diaphragm forming a wall to the second chamber, a third chamber in communication with the upstream end of the first inlet conduit which inlet conduit forms an outlet conduit to the third chamber, a fourth inlet conduit communicating with the third chamber, a third flexible diaphragm of effective area equal to that of the second flexible diaphragm disposed opposite the first flexible diaphragm and forming a wall to the third chamber, a fourth chamber, the third diaphragm forming a wall to the fourth chamber, the remaining portion of the wall thereto being provided with vent means for maintaining the pressure of the fluid in the fourth chamber at ambient pressure, a spindle rigidly interconnecting the three flexible diaphragms and projecting at one end into the second chamber and at the other end into the fourth chamber, the wall of the second chamber being formed with a bore opposite the said one end of the spindle, and the wall of the fourth chamber being formed with a bore opposite the said other end of the spindle.

16. A fluid-pressure variable function generator unit as claimed in claim 15, in which there is provided spring means arranged to urge the spindle axially.

17. A fluid-pressure variable function generator unit as claimed in claim 16, in which the spring means is adjustable.

18. A fluid system which comprises a chamber, an inlet conduit communicating with the interior of the chamber, an inlet constriction formed in the inlet conduit, a plurality of outlet conduits communicating with the interior of the chamber, a plurality of adjustable throttle valve means fitted one in each outlet conduit, a plurality of relief valve means fitted one in each outlet conduit and each arranged to open at a determined value of the fluid pressure within the chamber, a fluid-pressure relay, and a conduit providing communication between the input to the said relay and the interior of the chamber.

19. A fluid system as claimed in claim 18, in which the gain of the fluid-pressure relay is of the order of unity.

No references cited.

ISADOR WEIL, *Primary Examiner.*

SAMUEL FEINBERG, *Examiner.*